United States Patent [19]
Slavenburg et al.

[11] Patent Number: 5,692,139
[45] Date of Patent: Nov. 25, 1997

[54] VLIW PROCESSING DEVICE INCLUDING IMPROVED MEMORY FOR AVOIDING COLLISIONS WITHOUT AN EXCESSIVE NUMBER OF PORTS

[75] Inventors: Gerrit Ary Slavenburg, Mountain View; Jean-Michel Junien Labrousse, Palo Alto, both of Calif.

[73] Assignee: North American Philips Corporation, Signetics Div., New York, N.Y.

[21] Appl. No.: 425,697

[22] Filed: Apr. 19, 1995

Related U.S. Application Data

[63] Continuation of Ser. No. 63,850, May 19, 1993, abandoned, which is a continuation of Ser. No. 594,534, Oct. 5, 1990, abandoned, which is a continuation-in-part of Ser. No. 290,979, Dec. 28, 1988, abandoned.

[30] Foreign Application Priority Data

Jan. 11, 1988 [NL] Netherlands .................. 8800053

[51] Int. Cl.⁶ .................................................. G06F 13/38
[52] U.S. Cl. .................................. 395/311; 395/476
[58] Field of Search .................................. 364/200 MS File, 364/900 MS File; 395/400 MS File, 425 MS File, 311, 312, 427, 476

[56] References Cited

U.S. PATENT DOCUMENTS

| | | | |
|---|---|---|---|
| 4,435,758 | 3/1984 | Lorie et al. | 395/800 |
| 4,689,738 | 8/1987 | Van Wijk. | |
| 4,809,159 | 2/1989 | Sowa | 364/200 |
| 4,833,599 | 5/1989 | Colwell et al. | 395/650 |
| 4,920,477 | 4/1990 | Colwell et al | 395/425 |
| 4,930,066 | 5/1990 | Yokota | 395/425 |
| 4,943,912 | 7/1990 | Aoyama et al. | 364/200 |
| 5,021,945 | 6/1991 | Morrison et al. | 395/375 |
| 5,057,837 | 10/1991 | Colwell et al. | 395/375 |
| 5,081,575 | 1/1992 | Hiller et al. | 395/325 |
| 5,204,841 | 4/1993 | Chappell et al. | 365/230.05 |
| 5,222,229 | 6/1993 | Fuckuda et al. | 395/550 |
| 5,276,821 | 1/1994 | Imai et al. | 395/375 |
| 5,307,506 | 4/1994 | Colwell et al. | 395/800 |

FOREIGN PATENT DOCUMENTS

| | | |
|---|---|---|
| 315550 | 4/1988 | European Pat. Off.. |
| 317413 | 4/1988 | European Pat. Off.. |
| 325310 | 5/1989 | European Pat. Off.. |
| 325314 | 9/1989 | European Pat. Off.. |

OTHER PUBLICATIONS

Annaratone et al., "Warp Architecture and Implementation", Conf. Procs, 13th Int'l Symp. Comp. Arch, Jun. 5, 1986, pp. 346-355.

Hsu et al., "Highly Concurrent Scalar Processing", Conf. Procs. 13th Intl Symp Comp Arch., Jun. 5, 1986, pp. 386-395.

"Create-Life: A Modular Design Approach for High Performance ASIC's", by Labrousse and Slavenburg, Compcon Spring 1990, Feb. 26, 1990, pp. 427-433.

"HARP: A Parallel Pipelined RISC Processor", by Steven, Gray, and Adams, Microprocessors and Microsystems, vol. 13, No. 9, Nov. 1989, pp. 579-587.

*Primary Examiner*—David L. Robertson
*Attorney, Agent, or Firm*—Debra K. Stephens; Anne E. Barschall

[57] ABSTRACT

A processing device includes an imitation multiport memory circuit (10) interconnecting inputs and outputs of a group of functional units (F1, ... FN), all operating under control of a single series of very long program instructions. The memory circuit (10) comprises a plurality of separate memory units (15), each having a read port (12) connected to a respective functional unit input, and a crossbar switching circuit (18) connected between the functional unit outputs and write ports of the separate memory units. The memory circuit (10) provides substantially the same performance as a true multiport memory but requires a smaller circuit area, allowing a larger processing device to be integrated in one chip than previously. Collisions for access to a memory unit write port can be resolved without rescheduling by use of a delay element (21,70) and/or an additional write port (82) to a memory unit.

25 Claims, 7 Drawing Sheets

| Cy | COC | ALC | RGC | DMC | BRC | ALG | ALL | ALR | RG.G | RG.I | DM.G | DM.A | DM.I | BR.G | BR.A |
|---|---|---|---|---|---|---|---|---|---|---|---|---|---|---|---|
| 0 | Op005 | — | Op001 | — | — | — | — | — | — | — | — | — | — | — | — |
| 1 | Nw015 | Op006 | — | — | — | — | — | CO | — | — | — | — | — | — | CO |
| 2 | Op002 | Op003 | — | Op007 | Nw016 | — | RG | CO | — | — | — | AL | — | — | — |
| 3 | Op010 | — | — | Op004 | — | — | — | CO | — | — | — | AL | — | — | — |
| 4 | — | Op012 | — | Op008 | — | — | DM | — | — | — | — | DM | — | — | — |
| 5 | — | Op011 | — | Op013 | — | — | DM | — | — | — | — | XX | DM | — | — |
| 6 | — | — | — | Op009 | — | — | — | — | — | — | — | AL | DM | — | — |
| 7 | — | — | — | Op014 | — | — | — | — | — | — | — | — | — | — | — |

II.

| Cy | COC | ALC | RGC | DMC | BRC | ALG | ALL | ALR | RG.G | RG.I | DM.G | DM.A | DM.I | BR.G | BR.A |
|---|---|---|---|---|---|---|---|---|---|---|---|---|---|---|---|
| 0 | Op005 | — | Op001 | — | — | — | — | — | — | — | — | — | — | — | — |
| 1 | Nw015 | Op006 | — | — | — | — | — | CO | — | — | — | — | — | — | CO |
| 2 | Op002 | Op003 | — | Op007 | — | — | RG | CO | — | — | — | AL | — | — | — |
| 3 | Op010 | — | — | — | Nw016 | — | — | CO | — | — | — | AL | — | — | — |
| 4 | — | Op012 | — | Op004 | — | — | DM | — | — | — | — | DM | — | — | — |
| 5 | — | — | — | Op008 | — | — | — | — | — | — | — | AL | — | — | — |
| 6 | — | Op011 | — | Op013 | — | — | DM | — | — | — | — | DM | — | — | — |
| 7 | — | — | — | Op009 | — | — | — | — | — | — | — | AL | DM | — | — |
| 8 | — | — | — | Op014 | — | — | — | — | — | — | — | — | DM | — | — |

III.

| Cy | COC | ALC | RGC | DMC | BRC | ALG | ALL | ALR | RG.G | RG.I | DM.G | DM.A | DM.I | BR.G | BR.A | SP |
|---|---|---|---|---|---|---|---|---|---|---|---|---|---|---|---|---|
| 0 | Op005 | — | Op001 | — | — | — | — | — | — | — | — | — | — | — | — | — |
| 1 | Nw015 | Op006 | — | — | — | — | — | CO | — | — | — | — | — | — | CO | — |
| 2 | Op002 | Op003 | — | Op007 | Nw016 | — | RG | CO | — | — | — | AL | — | — | — | — |
| 3 | Op010 | — | — | Op004 | — | — | — | CO | — | — | — | AL | — | — | — | — |
| 4 | — | Op012 | — | Op008 | — | — | DM | — | — | — | — | DM | — | — | — | — |
| 5 | — | — | — | Op013 | — | — | DM | — | — | — | — | AL | DM | — | — | DM |
| 6 | — | Op011 | — | Op009 | — | — | — | — | — | — | — | SP | DM | — | — | — |
| 7 | — | — | — | Op014 | — | — | — | — | — | — | — | AL | — | — | — | — |

DEC.-.-.SE

VLIW PROCESSING DEVICE INCLUDING IMPROVED MEMORY FOR AVOIDING COLLISIONS WITHOUT AN EXCESSIVE NUMBER OF PORTS

CROSS-REFERENCE TO RELATED APPLICATION

This is a continuation of application Ser. No. 08/063,850, filed on May 19, 1993, which is a continuation of Ser. No. 07/574,534, filed on Oct. 5, 1990, which is a continuation-in-part of Ser. No. 07/290,979, filed on Dec. 28, 1988 all abandoned.

FIELD OF THE INVENTION

This invention relates to a processing device comprising a memory circuit and a group of functional units arranged for parallel operation under control of a single series of program instructions corresponding to successive operating cycles of the device. Such processing devices include those known in the art as very long instruction word (VLIW) processors.

DESCRIPTION OF RELATED ART

'The Ideal VLIW' processor and a practical VLIW processor known as the TRACE processor are described by R. P. Colwell et al in an article entitled 'A VLIW Architecture for a Trace Scheduling Compiler', published in the Proceedings of the Second International Conference on Architectural Support for Programming Languages and Operating Systems (ASPLOS II) at Palo Alto, Calif., Oct. 5–8, 1987, pages 180 to 192. In a VLIW processor, each program instruction is a binary word comprising a set of fields controlling respective functional units, and typically comprises more than 100 bits. A special compiler known in the art as a scheduler exploits fine-grain parallelism in a desired sequence of operations so as to compile these very long program instructions, making use of as many functional units as possible in every cycle.

The memory circuit in a VLIW machine, often referred to as a register file, serves to buffer intermediate results produced by the functional units and communicate these results to the data inputs of the same or other functional units for further processing. In the 'ideal' VLIW processor, the memory circuit is a fully multiported, random-access memory, so that every functional unit output is connected to a write port, and every functional unit input is connected to a read port, of a common set of memory cells.

Unfortunately, as noted by Colwell et al, in the ideal VLIW processor "any reasonable number of functional units requires an impossibly large number of ports to the register file". In response to this constraint, the TRACE processor uses true multiport register files only between pairs of functional units. Some of the performance of the ideal VLIW is inevitably lost, and the register files still require many ports, including additional ports for communication between themselves.

Monolithic integration is particularly desirable for a VLIW processor, whose internal bandwidth is very high compared with conventional processors. A monolithic VLIW processor is described by S. Borkar et al in a paper 'iWarp: An Integrated Solution to High-Speed Parallel Computing', presented at the conference Supercomputing '88, Kissimmee, Fla., Nov. 14–18, 1988. The iWarp component includes in effect five functional units, connected to a true multiported register file. Nonetheless, the size and complexity of true multiported memories remains a major obstacle to the construction and integration of large VLIW processors, where eight, ten, twenty or more functional units are desired.

Another form of VLIW processing device is described by B. R. Rau et al in U.S. Pat. Nos. 4,251,874 and 4,553,203, and in 'A Statically Scheduled VLSI Interconnect for Parallel Processors', presented at the CMU conference on VLSI Systems and Computations, October 1981. In that device, multiple registers are located at every cross-point in a crossbar circuit which connects every functional unit input to every functional unit output. With any significant number of functional units, the provision and control of such a large number of independent register files becomes impracticable.

A video signal processor is described in the copending parent application Ser. No. 290,979 referred to above in which a separate memory unit (referred to in Ser. No. 290,979 as a 'silo') is provided for each input of each functional unit (referred to in Ser. No. 290,979 as a 'processor element'). The inputs of the silos are connected to the result outputs of the processor elements by means of a crossbar switching circuit under program control. A similar structure for processing devices was described by the present inventors in 'CREATE-LIFE: A Design System for High Performance VLSI Circuits', Proc. IEEE International Conference on Computer Design, Oct. 3–5, 1988.

In operation, the program instructions for such a processing device are arranged to cause the writing of each result only into those memory units where the result will be required in future cycles. Writing of other results into other memory units can occur in parallel, giving subtantially the full performance of a true multiport memory, but with such a large saving in circuit area that a 32-bit VLIW processor with ten or even fifteen functional units could be integrated into a single chip using present technology.

The performance of this type of processor falls short of the ideal VLIW processor due to 'collisions', where two results need to be written to the same memory unit (silo) in the same operating cycle. While this shortfall is very minor in a device having only a few functional units, it has been found that collisions can cause a significant shortfall in the performance of such devices when the number of functional units is increased. A large number of collisions also makes the task of scheduling operations for the processing device more difficult, particularly since rescheduling to resolve one collision can easily lead to one or more further collisions.

SUMMARY OF THE INVENTION

It is an object of the invention to alleviate the problem of collisions in a processing device of the type described above.

In a first aspect, the invention provides a VLIW-type processing device wherein the memory circuit comprises:

a plurality of separate memory units, each memory unit having at least one write port and a read port which forms a respective output of the memory circuit;

a switching circuit connected between outputs of the functional units and the write ports of the separate memory units, the switching circuit being controlled by the series of program instructions such that a result from each functional unit can be transmitted to the write port of one or more memory units selected by the series of program instructions in each operating cycle; and a delay element having an input connected to the switching circuit, so that a result produced in one operating cycle by one of the functional units can be delayed within the memory circuit and written to a memory unit of the memory circuit in a subsequent operating cycle. By use of the delay element within the memory circuit, a collision can now be resolved without re-scheduling the operations for the various functional units. Approximately, the ideal VLIW performance is maintained, since it will always be the case that one of the two colliding results is required by the relevant functional unit before the other. If a new collision arises as a result of the delay, this too can be resolved using the delay element with no loss of performance.

The delay element may comprise a single-location memory unit, which may for example implement a fixed delay of one operating cycle. The switching circuit may be controllable by the program instruction to connect the input of the delay element to the output of the delay element to delay a result for more than one operating cycle.

A single delay element allows the resolution of only one two-valued collision per cycle (per instruction). There may therefore be provided a plurality of delay elements, enabling the simultaneous delay of a plurality of results produced in a single operating cycle. The number of delay elements can be chosen to be cost effective depending on the number of collisions expected. Moreover, the switching circuit may be capable of connecting each delay element to only a subset of the memory units, so as to reduce the circuit area required for the interconnections to the delay element(s).

Different types of delay element are also possible. A delay element may for example comprise a memory unit having a plurality of addressable locations, enabling the simultaneous delay of a plurality of results.

In a second aspect, the invention provides a processing device wherein at least one of the memory units of the memory circuit has more than one write port connected to the switching circuit. In such a device, 'colliding' results can indeed be written to the same memory unit in the same cycle. While the problems of true multiport memories begin to arise again in such an embodiment, the area occupied by eight separate memory units each having two write ports is less than that occupied by a true multiport memory having sixteen write ports. The additionial write port(s) can be provided as an alternative or additionally to the provision of delay elements for resolving collisions.

The same functional units may be provided in a device according to the invention as in the known VLIW processors. These include arithmetic and logic units, for integers and/or floating point numbers, data memory units, branch control units, and specialized units for multiplication, shifting, communication and so forth. Ideally, every unit is pipelined so that it can begin a new operation in every cycle, even though there may be a 'latency' of one or more cycles before the result of each operation is available.

BRIEF DESCRIPTION OF THE DRAWINGS

Embodiments of the invention will now be described, by way of example, with reference to the accompanying drawings, in which.

DETAILED DESCRIPTION OF THE EMBODIMENTS

Figure 1:
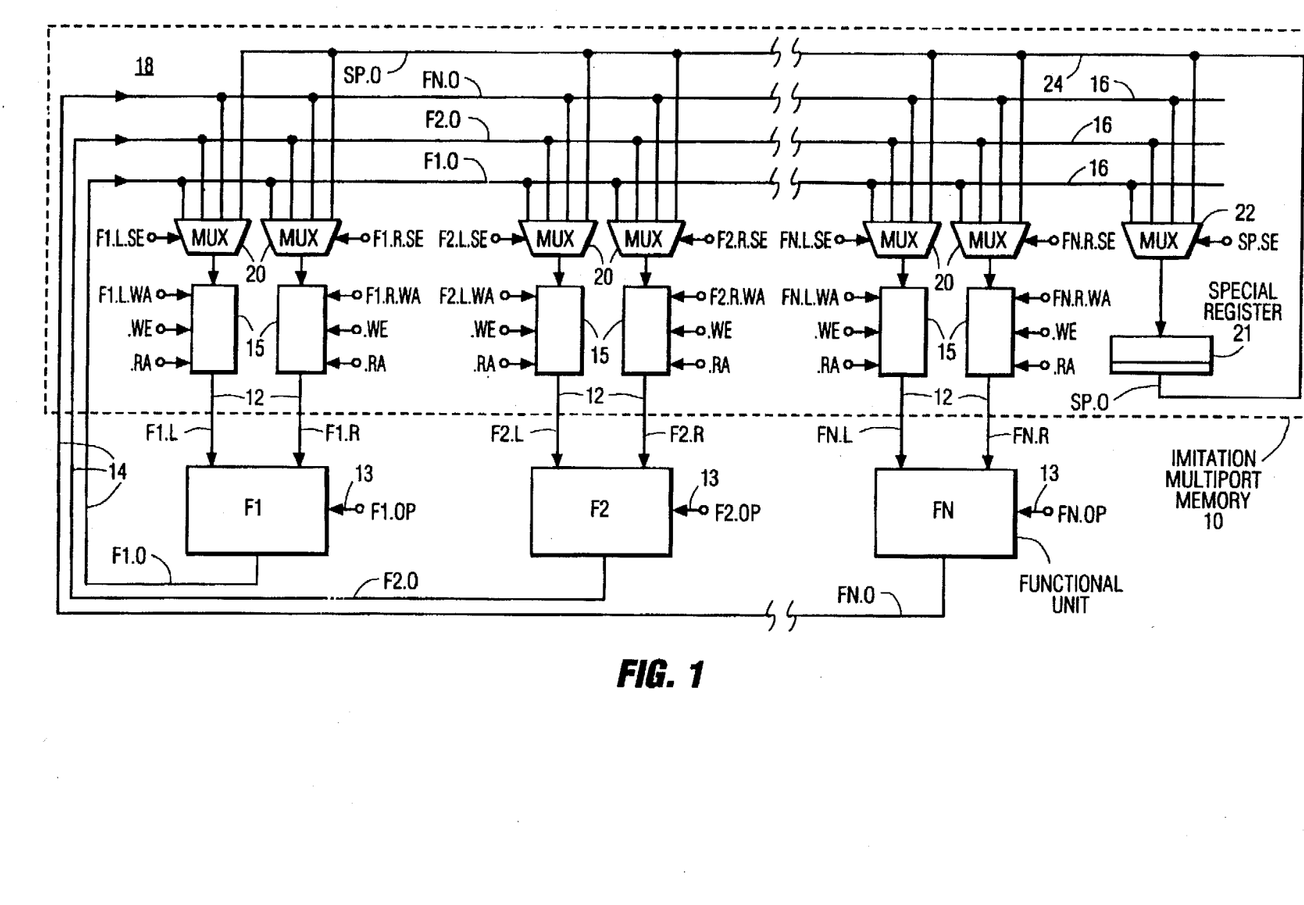
FIG. 1 shows a generalized processing device in accordance with the first aspect of the invention.

FIG. 1 shows in block schematic form a processing device comprising N Functional Units F1, F2, . . . FN and an imitation multiport memory circuit 10. Each Functional Unit Fk (where k is a number from 1 to N) has inputs for receiving first and second operands Fk.L and Fk.R from respective data outputs 12 of memory circuit 10. Each Functional Unit Fk has a control input 13 for receiving a respective operation selection code (opcode) Fk.OP from an instruction register (not shown in FIG. 1). An output of each Functional Unit Fk supplies a result Fk.O to a respective data input 14 of memory circuit 10.

Within the imitation multiport memory circuit 10, a separate read/write memory unit (RAM) 15 is provided for each data output 12 of memory circuit 10 (two per Functional Unit in this example). Each such memory unit 15 has a single read port for supplying the respective argument Fk.x (where x is L or R) to the associated Functional Unit via the data output 12. A read address input is associated with each read port and receives a read address Fk.x.RA from the instruction register.

Each data input 14 of memory circuit 10 forms a bus line 16 within a crossbar switching circuit 18 of memory circuit 10. The crossbar switching circuit 18 further includes a number of multiplexers 20, each having an output connected to a write port of a respective memory unit 15. Each multiplexer 20 can connect any one of the bus lines 16 (Functional Unit outputs) to the write port of the associated memory unit 15, under control of a selection signal Fk.x.SE received from the instruction register. The instruction register also supplies a respective write address Fk.x.WA to a write address input of each memory unit 15, and an associated write enable signal Fk.x.WE.

A delay element in the form of a Special Register 21 is provided in memory circuit 10. A data input of Special Register 21 can be connected via an additional multiplexer 22 in switching circuit 18 to any of the bus lines 16, under control of a selection signal SP.SE received from the instruction register (not shown). An output of Special Register 21 carrying a signal SP.O forms an additional bus line 24 in crossbar switching circuit 18. The bus line 24 can be connected by any of the multiplexers 20 to supply signal SP.O to the write port of the respective memory unit 15. The additional bus line 24 can also be selected for connection to the input of the Special Register by means of selection signal SP.SE.

The device shown in FIG. 1 forms part of a Very Long Instruction Word (VLIW) processor in which all Functional Units operate synchronously and in parallel, under the control of a program comprising a series of very long instruction words. Due to pipelining within the Functional Units and control circuitry, each Functional Unit Fk can begin a primitive operation in each operating cycle, drawing its operands from the multiport memory circuit 10 and writing its results back into memory circuit 10 in the same cycle or a subsequent cycle.

One instruction word per operating cycle is generated from data stored in a program memory. Different fields of the instruction word, which may be several hundred bits long, form the various address and selection signals suffixed .SE, .WA, .WE, .RA and .OP in FIG. 1, which control memory circuit 10 and select the functions to be performed by the Functional Units 8. By suitable programming (preferably automated by a scheduling compiler, as described below), fine-grain parallelism within an algorithm can be exploited to ensure that as many of the Functional Units as possible are beginning useful operations in every cycle.

In the ideal VLIW processor, a true multiport memory would provide that a result Fk.O from any Functional Unit output can be freely stored in the memory circuit and read later for use as an argument by any other Functional Unit Fk'. The imitation multiport memory circuit 10 can provide almost the same functionality by storing results only in memory units which are connected to the Functional Units that will need to use those results as operands in the future. Such future requirements are known to the scheduler from the intermediate code fragment itself.

Disregarding delay element 21 (SP), the imitation multiport memory 10 has the limitation that two results Fk.O and Fk'.O, produced in the same cycle by different Functional Units cannot both be written to the same memory unit (RAM) 15. If the scheduling compiler finds that two results produced in the same cycle are required in later cycles to be read from the same memory unit 15, this constitutes a 'two-value collision'. Higher-order collisions may also occur, of course, where three or more results produced in one cycle are required by the same Functional Unit input, but these are typically much less frequent than two-value collisions. Many collisions can be resolved with minimal disruption, for example by swapping the left and right operands of a symmetrical operation. In general, however, some more substantial rescheduling must be effected. The problem of collisions, and its solution using delay elements will now be described. Further illustration will then be provided by reference to the specific processor of FIGS. 2 to 4.

The delay element in the form of the Special Register 21 (SP) allows the imitation multiport memory 10 to provide the performance of a true multiport memory even in the case where a two-value collision occurs in a given cycle. Suppose that results F1.O(i) and F2.O(i), produced in the same cycle i by Functional Units F1 and F2 are both required in later cycles to form the first operand F1.L for Functional Unit F1. Since in this embodiment each memory unit has only one read port, it will always be the case that one of these results, say F1.O(i), is required before the other, that is F2.O(i). The scheduler can direct F1.O(i) immediately to the desired location in the memory unit 15 for operand F1.L by means of the fields F1.L.SE(i), F1.L.WA(i) and F1.L.WE(i) in the instruction word for cycle (i). The less urgent result F2.O(i) can in the same instruction word be directed to Special Register 21 by means of field SP.SE(i). Assuming that register 21 implements a fixed delay of one cycle, the delayed result F2.O(i) will emerge in the following cycle as SP.O(i+1). The fields F1.L.SE(i+1), F1.L.WA(i+1) and F1.L.WE(i+1) in the next instruction (cycle i+1) can then be used to direct delayed result F2.O(i) into the memory unit for operand F1.L where it is required.

This can be done without affecting the positions of the operations in the schedule. It is noted that the delaying of a result may give rise to a further collision, for example if it is found that a third result, say F1.O(i+1), produced in cycle i+1 also has to be written into the same memory unit. This collision can also be resolved without loss of performance because again one of the results F2.O(i) and F1.O(i+1) will always be required sooner than the other. Depending on which result is more urgent, either (a) delayed result F2.O (i)=SP.O(i+1) can be directed back into register 21 for a further cycle's delay while F1.O(i+1) is written to the memory unit or (b) F1.O(i+1) can be directed to Special Register 21 to become SP.O(i+2) while delayed result F2.O (i)=SP.O(i+1) is written to the memory unit.

With the single register 21 as the delay element, only a single two-value collision can be resolved at any one time. By adding further registers similar to register 21, three-value collisions could be resolved, and/or multiple two-value collisions. Each register and associated multiplexer 22 requires very little additional circuit area.

The nature and number of the Functional Units, the number and length of their operands and results, and the number of locations in each associated memory unit can all be freely chosen to suit the application for which the device is intended. A relatively small VLIW device will now be described as an illustrative example with reference to FIGS. 2 to 6.

Figure 2:
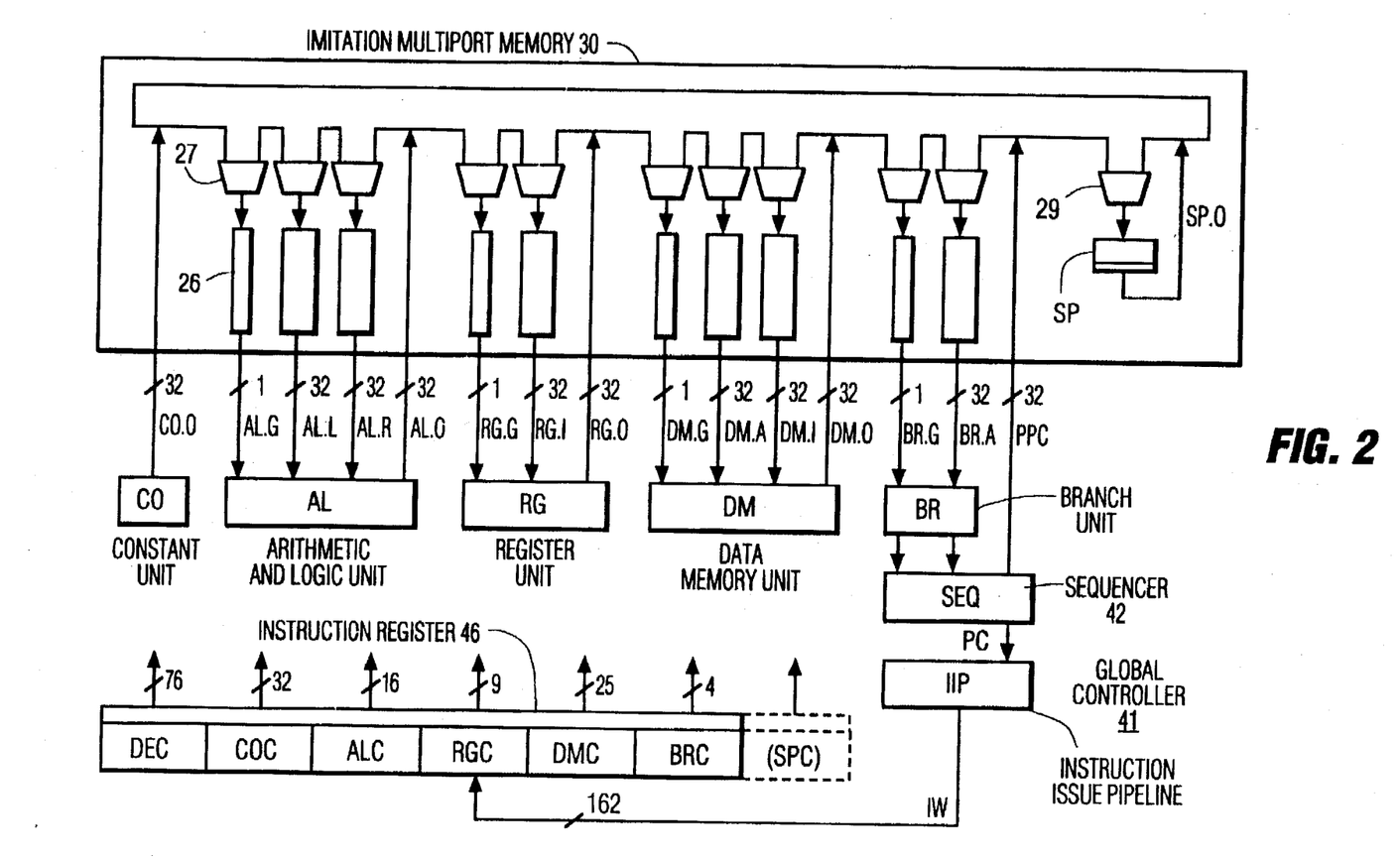
FIG. 2 shows a specific processing device in accordance with the first aspect of the invention.

In FIG. 2, an imitation multiport memory circuit 30 is connected to five functional units including a Constant Unit CO, an Arithmetic and Logic Unit AL, a Register Unit RG, a Data Memory Unit DM and a Branch Unit BR. Within memory circuit 30 there are shown in schematic form memory units 26, multiplexers 27 and a Special Register SP with an associated multiplexer 29.

A Global Controller 41 is provided which comprises a Sequencer SEQ and an Instruction Issue Pipeline IIP. The Sequencer SEQ generates in each cycle a program counter word PC which is supplied to Instruction Issue Pipeline IIP. The Instruction Issue Pipeline IIP may be off-chip, and includes the program memory wherein the very long instruction words forming the program for execution are encoded. After a certain number of cycles delay, Instruction Issue Pipeline IIP feeds an on-chip Instruction Register 46 with a very long instruction word IW stored in the program memory at the address PC.

Figure 3:
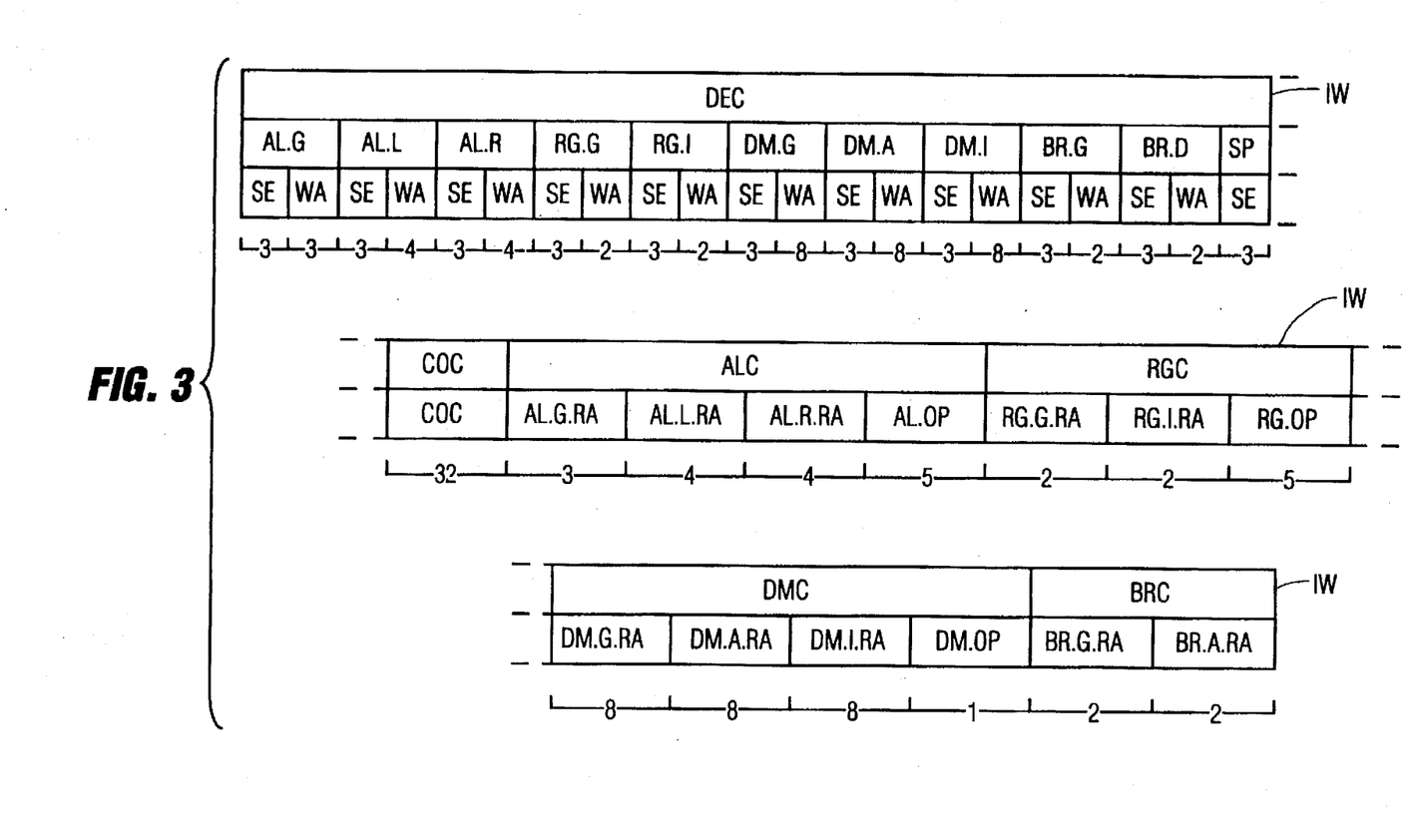
FIG. 3 shows the format of a very long instruction word in the device of FIG. 2.

The instruction word IW in register 46 comprises a Destination Control field DEC and a number of fields COC, ALC, RGC, DMC and BRC for controlling the individual functional units CO, AL, RG, DM and BR respectively. The total number of bits in instruction word IW is 162, although the processor described is a very simple example. FIG. 3 shows fields of the instruction word IW in more detail, with the number of bits in each field marked shown beneath that field.

Constant Unit CO has no operand inputs and one 32-bit result output (CO.O) connected to an input of memory circuit 30. Constant Unit CO in fact comprises a direct connection between the 32-bit field COC in instruction word IW (FIG. 3) and the output of Constant Unit CO. Constant Unit CO thereby enables constant values to be supplied from within the instruction word to the other units via the memory circuit 30.

Arithmetic and Logic Unit AL has a 1-bit guard value input (AL.G) and two (left and right) 32-bit argument inputs (AL.L and AL.R) connected to respective memory units within memory circuit 30. The unit AL has a 32-bit output (AL.O) connected back into memory circuit 30, and is controlled by a 16-bit field ALC of instruction word IW.

Figure 4:
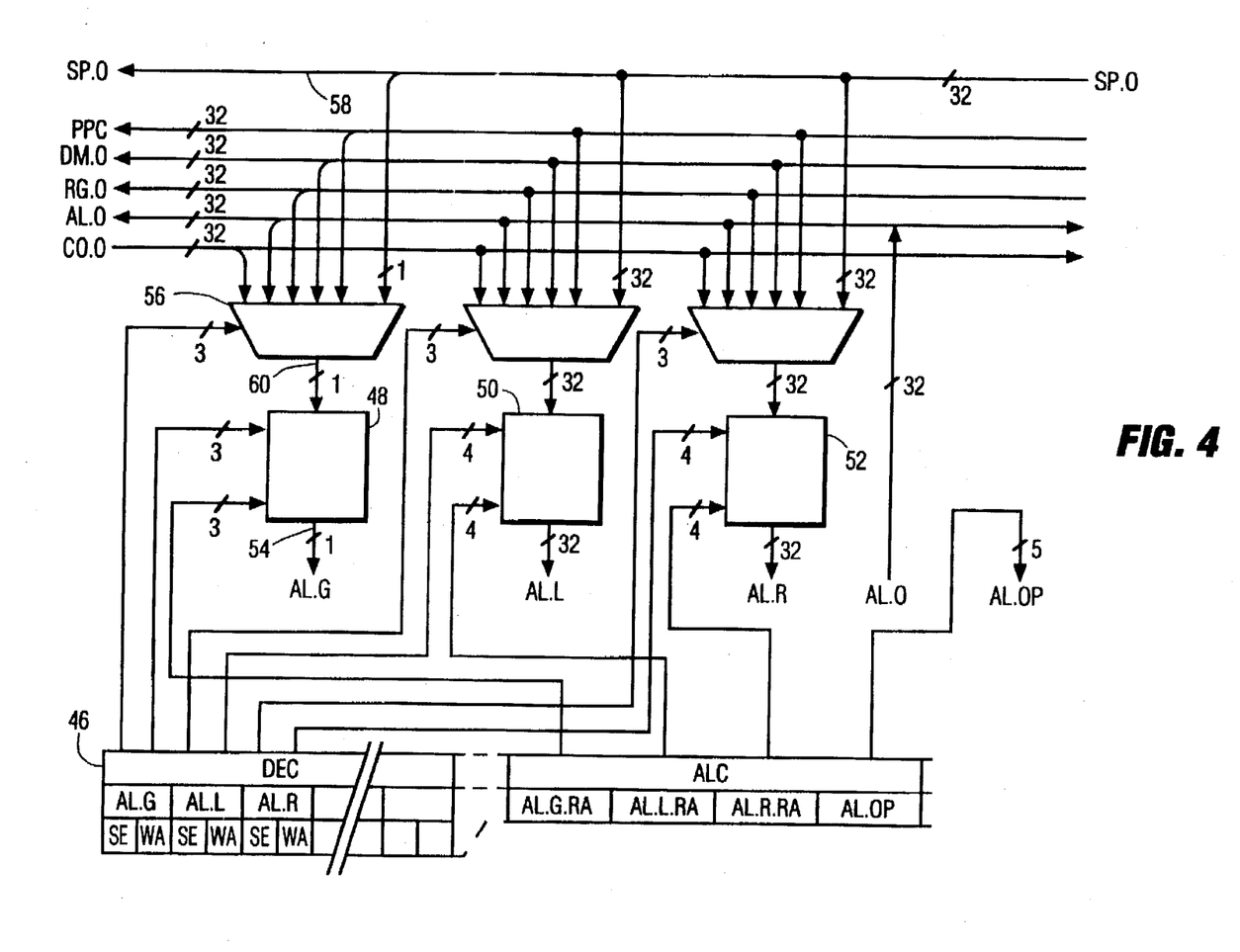
FIG. 4 shows a part of the imitation multiport memory in the device of FIG. 2.

FIG. 4 shows in detail the part of the imitation multiport memory circuit 30 associated with Arithmetic and Logic Unit AL. As in the generalized embodiment of FIG. 1, separate memory units (RAM's) 48, 50 and 52 are associated with operands AL.G, AL.L and AL.R respectively. In contrast to the embodiment of FIG. 1, however, no separate write enable signals .WE are provided for the memory units in the device of FIGS. 2 to 4. Instead, at least one non-existent or at least non-writable storage location can be addressed when writing to that memory unit is not desired. The width of instruction word IW can therefore be reduced by the absence of the .WE bits, on the assumption that the value of these bits is already known at the time of scheduling, when results are allocated to specific memory unit locations.

The memory unit 48 for guard bit AL.G has eight 1-bit locations for storage of boolean values (bits), including one non-writable location as just described. A 3-bit read address for memory unit 48 is supplied by Instruction Register 46 from a 3-bit field AL.G.RA in control field ALC of instruction word IW (see FIG. 3), and a 1-bit read port 54 of the memory unit supplies a guard bit AL.G to unit AL from the addressed memory location.

A multiplexer 56 has a number of 1-bit inputs connected to the least significant bits (lsb's) of the 32-bit bus lines which are connected to the result outputs (CO.O, AL.O, etc.) of the various functional units. An additional input of the multiplexer is connected to the lsb of an additional 32-bit bus line 58, which carries a delayed result output SP.O from Special Register SP, which is of the same type as the delay element referenced 21 in FIG. 1. The use of the lsb for the guard bits affords compatibility with certain programming conventions, including for example those of the 'C' language. In other environments the most significant bit (msb) or some other bit might be a more convenient choice.

The multiplexer 56 has a 1-bit output 60 connected to a write port of memory unit 48. The multiplexer 56 is controlled by a 3-bit selection field AL.G.SE in the Destination Control field DEC of instruction word IW. A 3-bit write address for the write port of memory unit 48 is provided by the adjacent 3-bit field AL.G.WA in the Destination Control field DEC.

In a similar manner, 32-bit memory units 50 (for AL.L) and 52 (for AL.R) have associated 32-bit multiplexers 62 and 64 respectively. Each has 16 locations, including one non-writable location. Destination Control field DEC contains two 3-bit selection fields AL.L.SE and AL.R.SE for controlling multiplexers 62 and 64 and two 4-bit fields AL.L.WA and AL.R.WA providing 4-bit write port addresses for memory units 50 and 52 respectively. Two 4-bit fields AL.L.RA and AL.R.RA in control field ALC provide read addresses for the read ports of memory units 50 (for AL.L) and 52 (for AL.R) respectively.

An opcode AL.OP for Arithmetic and Logic Unit AL is provided by a 5-bit field in control field ALC for unit AL. In each cycle, opcode AL.OP determines what operation (add, subtract, compare, AND, OR, etc.) is to be performed on the arguments AL.L and AL.R to generate the result AL.O.

Returning to FIG. 2, Register Unit RG provides on-chip storage for sixteen frequently used program variables of 32 bits each. The unit RG has associated memory units within memory circuit 30 for a guard bit RG.G and a 32-bit data input RG.I. These memory units have only four locations each, including one non-writable location. A data output (RG.O) is connected to an input of memory circuit 30 wherein it forms a respective bus line (RG.O, see also FIG. 4). Destination Control field DEC contains two 3-bit selection fields RG.G.SE and RG.I.SE for controlling the associated multiplexers and two 2-bit write address fields RG.G.WA and RG.I.WA for selecting between the four locations in the respective memory units.

Within the 9-bit Register Unit control field RGC, two 2-bit read addresses RG.G.RA and RG.I.RA are provided for selecting the location of the values RG.G and RG.I to be read from their respective memory units. A 5-bit opcode field RG.OP contains one bit to select between register read and register write functions, and four bits to select between the sixteen registers within unit RG. The location of a variable within Register Unit RG is therefore fixed by the compiler.

Data Memory Unit DM contains, at least conceptually, a larger amount of storage for variables, and comprises in practice an interface to an off-chip bank of read/write and/or read-only memory, via an on-chip cache memory, in a manner well known to those skilled in the art. Within the imitation multiport memory circuit 30, separate memory units are provided for a guard bit DM.G, a 32-bit address word DM.A and a 32-bit input data word DM.I. These memory units have 256 locations each, including one non-writable location. Data Memory Unit DM has a 32-bit data output (DM.O) connected to an input of memory circuit 30 wherein it forms a respective bus line (DM.O, see also FIG. 4). Destination Control field DEC contains three 3-bit selection fields DM.G.SE, DM.A.SE and DM.I.SE for controlling multiplexers within memory circuit 30, and three 8-bit write address fields DM.G.WA, DM.A.WA and DM.I.WA for selecting between the 256 locations in each of the associated memory units.

Within the 25-bit Data Memory Unit control field DMC, three 8-bit read addresses DM.G.RA, DM.A.RA and DM.I.RA are provided for selecting the location of the values DM.G, DM.A and DM.I to be read from their respective memory units. A 1-bit opcode field DM.OP contains one bit to select between memory read and memory write functions. The address word DM.A defines the address for the writing of data word DM.I or the reading of data word DM.O. This allows the dynamic calculation of 32-bit addresses during running of programs, enough to address $2^{32}$ locations.

Branch Unit BR allows the sequence of instruction addresses PC generated by Sequencer SEQ to be modified to cause branching in the program execution. The unit BR has associated memory units within memory circuit 30 for a guard bit BR.G and a 32-bit destination address BR.A. These memory units have four locations each including a non-writable location. Destination Control field DEC contains two 3-bit selection fields BR.G.SE and BR.A.SE for controlling the associated multiplexers and two 2-bit write address fields BR.G.WA and BR.A.WA for selecting between the four locations in the respective memory units.

Within the 4-bit Branch Unit control field BRC, two 2-bit read addresses BR.G.RA and BR.A.RA are provided for selecting the location of the values BR.G and BR.A to be read from their respective memory units. Branch Unit BR simply passes guard bit BR.G and destination address BR.A to the Seqencer SEQ. No opcode field BR.OP is required. Within Sequencer SEQ, the boolean value of guard bit BR.G is tested. If BR.G is TRUE, then a branch is to be implemented and Sequencer SEQ makes the next value of PC equal to destination address BR.A received from memory circuit 30. If BR.G is FALSE, then Sequencer SEQ merely increments the value of PC to PC+1, addressing the next instruction in the stored program.

Therefore, by directing a logic result AL.O to the memory unit for BR.G (lsb TRUE or FALSE), conditional branching can be effected. Unconditional (always or never) branching can be effected by directing a constant result CO.O to the memory unit for BR.G, or by arranging that non-writable locations in that memory unit are permanently TRUE or permanently FALSE. This is particularly convenient in the present embodiment, since at least one location in each memory unit is already non-writable, as described above. A guard bit BR.G=FALSE (branch never) will often be required when no branch operation is to be started in a given cycle.

Sequencer SEQ also produces a pseudo-program counter value PPC which is fed to an input of memory circuit 30 wherein it forms a bus line (PPC, see FIG. 4). The PPC can be used by other functional units, including Branch Unit BR to implement program counter-relative addressing. For this purpose a read delay may be defined as the difference between the cycle number of an instruction reading a value PPC from the bus line into a memory unit and the cycle number of the instruction with PC equal to that value of PPC.

In operation, a branch delay of b cycles occurs between the cycle i in which a branch instruction is issued, and the first cycle i+b in which the instruction word IW(i+b) is affected by the branch instruction. The same boolean value which conditions the branch instruction can be directed to the guard bit inputs AL.G, RG.G, DM.G and BR.G and be used in the intervening cycles to conditionally inhibit state-changing operations scheduled for the various functional units during the branch delay, including further branches. Using knowledge of branching probabilities, the compiler is thereby enabled to schedule useful operations within the branch delay of an improbable conditional branch instruction, while ensuring a correct state in the minority of cases where the branch condition is met. To enable unguarded operations to be initiated most efficiently on these units, the non-writable location of each guard bit memory unit can be arranged to yield TRUE at their read ports in response to the appropriate read addresses .RA. The non-writable locations of the 32-bit operand memory units may also be arranged to yield some known, frequently required value, for example zero.

Only the contents of the off-chip memory, the registers of Register Unit RG and the program counter PC are considered part of the programmer-visible state of the processing device in the present embodiment. The imitation multiport memory circuit 30 is used by the compiler as a buffer for intermediate variables on a strictly temporary basis. Consequently, functional units such as Constant Unit CO do not require guarding. Arithmetic and Logic Unit AL is provided with guarding to avoid exceptions such as arithmetic overflows arising spuriously, even though unit AL cannot itself alter the programmer-visible state of the device.

In addition to the branch delay of Branch Unit BR, the scheduling compiler must have knowledge of the so-called 'latency' of every functional unit. The latency of a functional unit is defined as the difference between the number of the cycle in which an operation is started and the number of the cycle in which the result (AL.O etc.) of that operation is produced and directed by Destination Control field DEC to the desired location(s) in the imitation multiport memory circuit 30. The branch delay mentioned above may be considered as the sum of the latency due to Branch Unit BR and a latency due to Sequencer SEQ and the off-chip Instruction Issue Pipeline IIP.

For the purpose of the following programming example, it is assumed that the latencies for the functional units are as follows:

Unit CO—zero cycles latency;

Unit AL—1 cycle latency;

Unit RG—1 cycle latency;

Unit DM—2 cycles latency; and

Unit BR—5 cycles branch delay.

Listing 1 below comprises a fragment of high level language source code. Two records in memory are pointed to by variables p and q. The aim of the program is to cause copying of two 32-bit values from fields in the q record to two corresponding fields in the p record.

Figure 5:
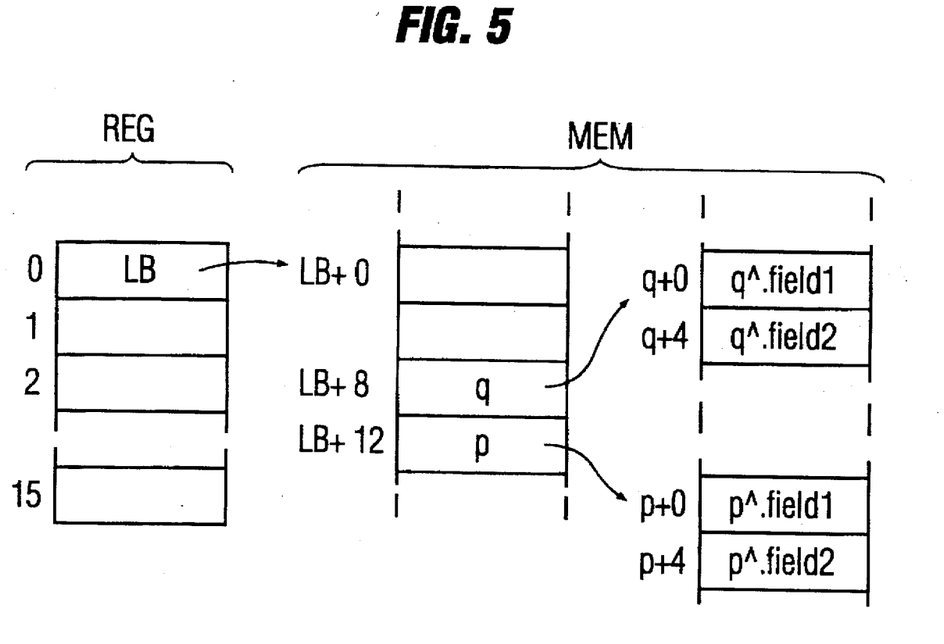
FIG. 5 illustrates the operation of an example program fragment.

Listing 1 p^.field1:=q^.field1;

p^.field2:=q^.field2;

FIG. 5 illustrates one possible organization of data that might be used to implement the high level instructions of Listing 1. Storage for program variables is provided by a high-speed register file REG, having sixteen locations numbered 0 to 15, and a larger bank MEM of (off-chip) read/write memory. A Local Base address LB is stored in location 0 of register file REG. The address LB points to the start of a table of variable values in memory bank MEM, wherein the two record pointers p and q are stored at locations LB+12 and LB+8 respectively. Each variable p and q is a pointer to the start of the corresponding record, located elsewhere in memory bank MEM. The first field of each record is stored at an offset of zero from the address defined by the relevant pointer variable. The second field of each record is stored at an offset of four from the relevant pointer variable. Thus the value q^.field2 can be read from the location whose address is q+4.

Listing 2 shows an intermediate code fragment, labelled T1, that might be generated by a compiler to execute the high level instructions of Listing 1 on a VLIW processor, assuming the data organization described above with reference to FIG. 5. Each line of Listing 2 defines a single primitive operation Op001 to Op014 to be scheduled for execution by a suitable functional unit. A comment (* . . . *) at the end of each line first mentions the type of functional unit required (AL, RG, CO etc.) and then describes the result (output) of that operation. The references 001 and 002 in operation Op003 (for example) indicate that the operands for Op003 are the results of Op001 and Op002 respectively. Thus the effect of operation Op003 is to add the results of operations Op001 and Op002, while the effect of operation Op009 is to write the result of Op008 into the off-chip data memory at a location addressed by the result of Op004. Combining this information with the description of FIG. 5 above, the purpose of each operation Op001 to Op014 in Listing 2 in implementing the function specified by Listing 1 should be self-explanatory.

Listing 2

T1:

| Op001 | rdreg (0);       | (* RG, Local Base address *)    |
| Op002 | constant (12);   | (* CO, offset value for p *)    |
| Op003 | aplus 001 002;   | (* AL, address of p *)          |
| Op004 | read 003;        | (* DM, p *)                     |
| Op005 | constant (8);    | (* CO, offset value for q *)    |
| Op006 | aplus 001 005;   | (* AL, address of q *)          |
| Op007 | read 006;        | (* DM, q *)                     |
| Op008 | read 007;        | (* DM, q^.field1 *)             |
| Op009 | write 004 008;   | (* DM, p^.field1 := q^.field1 *)|
| Op010 | constant (4);    | (* CO, offset for field2 *)     |
| Op011 | aplus 004 010;   | (* AL, address of p^.field2 *)  |
| Op012 | aplus 007 010;   | (* AL, address of q^.field2 *)  |

Listing 2

```
Op013    read 012;         (* DM, q^.field2 *)
Op014    write 011 013;    (* DM, p^.field2 := q^.field2 *)
GOTO EXIT
```

It will be appreciated that the intermediate code fragment T1 is shown sequential, and not specific to any particular configuration of VLIW processor, provided that at least one functional unit is suitable to perform each operation. Once the compiler has arrived at the collection of such fragments that make up an application program, it is the task of a scheduler to map each operation of the fragment to a particular functional unit in a particular cycle in a particular device configuration. The scheduler operates with a set of constraints defined by the structure of the particular VLIW processor. These constraints include primarily the number and type of functional units available in the target VLIW processor, and the latency of each functional unit. Other constraints include the number of locations in each memory unit of the imitation multiport memory. These locations are allocated dynamically by the scheduler as required. For the purpose of the simple scheduling problem presented by the fragment T1, it will be seen that the number of locations in each memory unit in the VLIW processing device of FIGS. 2 to 4 is sufficient that the limited capacity of the memory units need not be considered as a constraint in the present description.

The latency for each operation is important because operations dependent on the results of other operations must not be scheduled until the latencies of all those other operations have expired. Thus, for example, operation Op009 must be scheduled at least 2 cycles later than Op004 (DM latency is 2) and at least 2 cycles later than Op008. Similarly, operation Op011 can be scheduled in the same cycle as Op010 (CO latency is zero), but must be at least 2 cycles later than Op004 (DM latency is 2). This assumes that simultaneous write and read of a memory unit location is possible. Otherwise a further one cycle latency may be needed for each type of operation.

Figure 6:
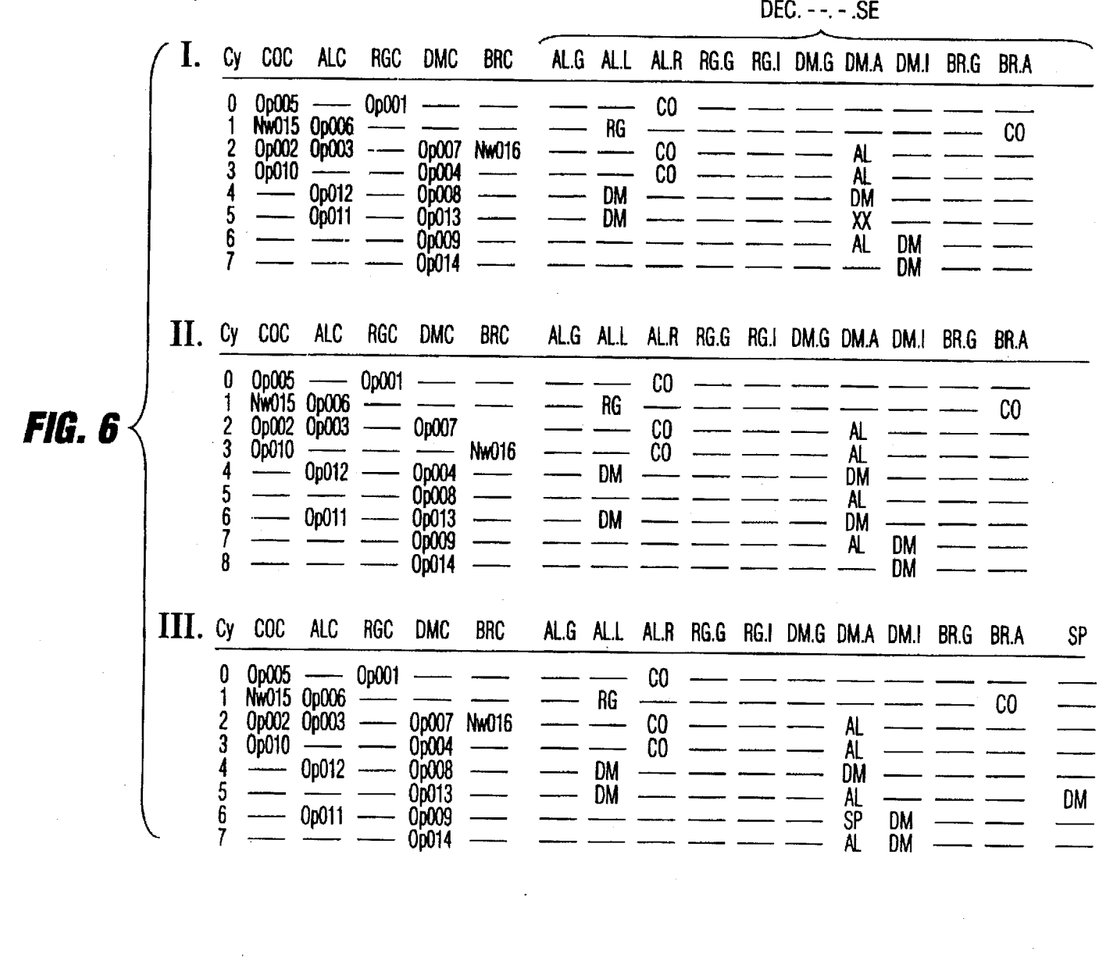
FIG. 6 illustrates the scheduling of the example program fragment for the device of FIG. 2, including the problem of collisions.

FIG. 6 shows three different schedules (I, II and III), each mapping the intermediate code fragment T1 onto the specific VLIW processor described above with reference to FIGS. 2, 3 and 4. Each row of each table represents one very long instruction word IW, and hence one machine cycle. Cycle numbers are given in the left-most column, headed Cy. The next five columns represent the five control fields COC, ALC, RGC, DMC and BRC for the five functional units (CO etc. in FIG. 2). Each control field begins an operation on its respective functional unit. Thus in Schedule I, Cycle 0, field COC instructs Constant Unit (CO in FIG. 2) to begin Op005, so that result CO.O=8 appears at the output of unit CO in the same cycle (CO latency is zero). Similarly, the register reading operation Op001 is initiated in Cycle 0 by field RGC. The value LB of the Local Base address is thus RG.O in Cycle 1 (RG latency is 1).

The selection fields DEC.—.—.SE of Destination Control field DEC in each instruction are represented to the right of the functional unit control fields. These fields direct the results of the various operations Op001–Op014 into respective memory units as such results become available. The scheduler takes account of the latencies of the various functional units in defining Destination Control field DEC. Thus, for example, result RG.O of register reading operation Op001, started by field RGC in Cycle 0, is directed to the left operand memory unit of Arithmetic and Logic Unit AL by field DEC.AL.L.SE in the following instruction, Cycle 1. This is indicated by the code RG in the AL.L column in Schedule I, Cycle 1. Similarly, memory reading operation Op007 is started by field DMC in Cycle 2, while result DM.O of that operation is directed to the address memory unit of Data Memory Unit DM by setting field DEC.D-M.A.SE to 'DM' in Cycle 4 (DM latency is 2).

The scheduler adds its own operations Nw015 and Nw016 to effect a jump to the next fragment ('GOTO EXIT' in Listing 2). Nw015 uses Constant Unit CO in Cycle 1 to define the target address for the branch, which is directed to the address memory unit of Branch Unit BR by setting selection field DEC.BR.A.SE to 'CO' in Cycle 1. Nw016 uses branch control field BRC, also in Cycle 1, to initiate an unconditional (BR.G=1) branch to the target address. The long branch delay of 5 cycles ensures that transfer of control to the target address does not occur until Cycle 8, after fragment T1 has completed. In other words, the branch operation has been brought forward in the schedule so that useful operations can be scheduled for execution during the branch delay. It may be noted that only about one third of the potential maximum number of operations are actually scheduled in FIG. 6, Schedule 1. This is due to the very small size of the example fragment, and it will be understood by those skilled in the art that a higher proportion of useful operations can be scheduled when scheduling a longer fragment, because of the higher degree of parallelism inherent in longer fragments.

The large number of conditional branching operations inherent in longer fragments is overcome in the embodiment described by use of the boolean-valued guard bits .G, exploiting the fact that most conditional branches can be arranged to have a branch probability close to one or close to zero. For example, a loop to be executed 100 times will involve a branch which can be predicted to occur with a probability of 0.99 or 0.01.

The Schedule I in FIG. 6 could have been executed by a VLIW machine having a true multiport memory, ignoring the Destination Control field DEC altogether. However, Schedule I contains a collision for access to a memory unit of the imitation multiport memory, and is thus not a valid mapping of operations Op001–Op014 onto the processor of FIGS. 2, 3 and 4. In Cycle 5 of Schedule I, result DM.O of Op004 is destined for the left operand memory unit (AL.L) of Arithmetic and Logic Unit AL and for the address memory unit (DM.A) of Data Memory Unit DM. In the same Cycle 4, result AL.O of Op012 is also destined for the address memory unit (DM.A) of Data Memory Unit DM. This collision is marked by the code XX in field DEC.D-M.A.SE in Cycle 5, Schedule I.

In the absence of the delay element (Special Register SP), the scheduler would be forced to reschedule these operations when it discovered the collision, until the constraints of the processor hardware are satisfied. In the present example, this might lead to Schedule II of FIG. 6. In Schedule II, Op004 has been delayed by one cycle, to start in Cycle 4. Dependent on the result of Op004, however, are operations Op009, Op011, and Op014, which must therefore also be delayed by at least one cycle. These operations were interleaved in Schedule I with other operations Op012, Op008, Op013 and Op014, which must also be rescheduled because of the constraints of the hardware.

This process of rescheduling, or 'backtracking', can always be completed to satisfy the hardware constraints, but the rescheduled fragment T1 now occupies 9 cycles instead of 8. This means that this part of the application program takes 12.5% longer than it would in an ideal VLIW machine having the same functional units. Furthermore, backtracking involves the compiler in extra work, including the resolution of fresh collisions that arise in resolving the first collision. The problem of increased compiler effort becomes especially acute in larger machines, where a collision might occur almost every cycle. It will be apparent that the existence of a collision is not generally detected until several instructions have been scheduled beyond the cycle in which the collision occurred. In a large machine of ten or more functional units, this will necessitate the rescheduling of tens or even hundreds of operations, with the potential for new collisions to arise just as frequently during the rescheduling.

FIG. 6, Schedule III represents the resolution of the example collision without backtracking, using the delay element in the form of Special Register SP, as described above for the generalized machine of FIG. 1. The selection field DEC.SP.SE in Destination Control field DEC is shown at the right in Schedule III. It will be seen that the scheduling of operations Op001–Op014 and Nw015–Nw016 is almost identical to that of Schedule I (true multiport memory). In Schedule III, however, the collision in Cycle 5 between the two results destined for the DM.A memory unit is resolved by directing the result DM.O of Op004 in to the Special Register, that is by setting field DEC.SP.SE to 'DM' in Destination Control field DEC. The field DEC.DM.A.SE is then set to 'SP' in Cycle 6 to direct the delayed result of Op004 to the DM.A memory unit in time for it to be read by Data Memory Unit DM in Op009, Cycle 6.

The delayed result of Op004 now collides in Cycle 6 with the result of Op011, both being destined for the DM.A memory unit. In Schedule III, the start of Op011 has therefore been delayed to Cycle 6, with no consequential effect on any other operations. An alternative solution to this second collision would have been to leave Op011 in Cycle 5, while delaying the result of Op011 by setting field DEC.SP.SE to 'AL' in Cycle 6. The delayed result of Op011 could then have been directed to the DM.A memory unit in time for the start of Op014 by setting field DEC.DM.A.SE to 'SP' in Cycle 7.

Special Register SP will always be effective to maintain the performance level of a true multiport machine while avoiding backtracking, so long as only a single, two-value collision arises in any given cycle. This follows from the fact that a functional unit can only read one value from a memory unit in each cycle, which means that one of the colliding results will always be required before the other. If, for the sake of argument, the result of Op011 had turned out to be more urgently required than the result of Op004, the result of Op004 could have been delayed by two cycles, or any number of cycles, until finally it became more urgent than a colliding result. In all cases, the need for consequential rescheduling of other operations can be avoided.

Figure 7:
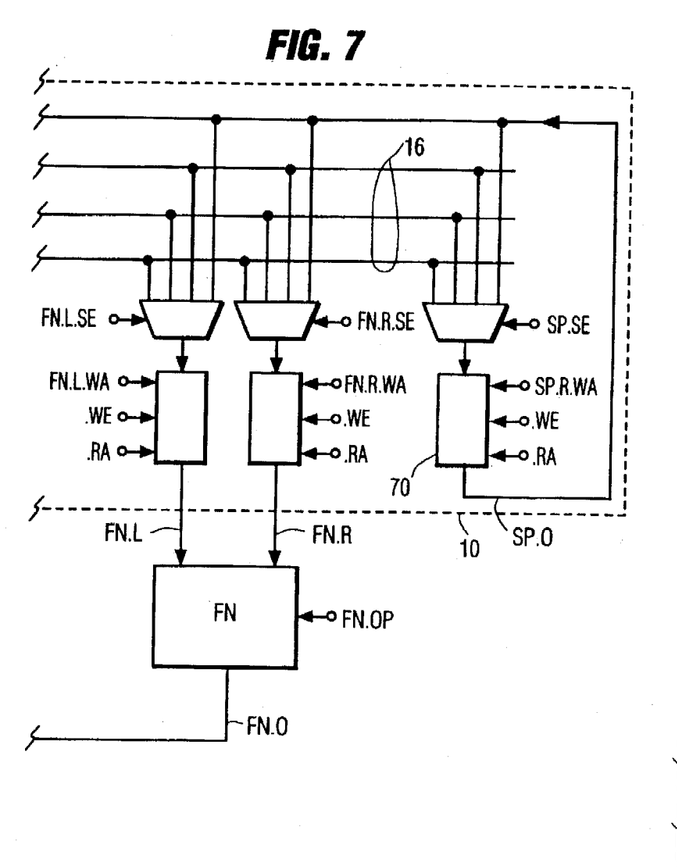
FIG. 7 shows a modification of the generalized processing device of FIG. 1.

Returning to the generalized VLIW machine of FIG. 1, FIG. 7 shows an enhanced delay element in the form of a special random-access memory unit 70 having a number of locations, rather than a simple register implementing a fixed delay. The instruction register for this embodiment supplies an additional control field defining a read port address SP.RA, a write port address SP.WA and an associated write enable signal SP.WE for the special memory unit 70. The several different locations of the special memory unit allow the scheduler to resolve a corresponding number of 'overlapping' two-value collisions. These overlapping collisions are collisions that arise in different cycles, but overlap each other because results need to be delayed by more than one cycle.

To enable the resolution of higher order collisions, and/or multiple two-value collisions arising in a single cycle, it is a simple matter to add further delay elements. The designer of a VLIW machine is free to vary the number of such elements to achieve a cost-effective machine in the same way as he or she can vary the number and types of the functional units and the sizes of the memory units for their respective operands. The delay elements may take the form of simple delay registers, addressed random-access memory units, a mixture of both of these, or any other useful form. Each delay could be limited to serving a subset of the functional units of the machine, in terms of its input and/or output, to reduce the circuit area occupied by the necessary bus lines.

Once an automatic scheduler has been programmed with the constraints defined by a given hardware configuration, the human programmer need not be concerned with the detailed assignment of operations within the VLIW processor. Since all such detail is fixed by the scheduler at compile time, and not by a run-time scheduler as in some known parallel computers, the designer of a VLIW machine can rapidly compare the performance of a variety of configurations simply by running the scheduler using the appropriate constraints, without the need to construct a working machine.

Figure 8:
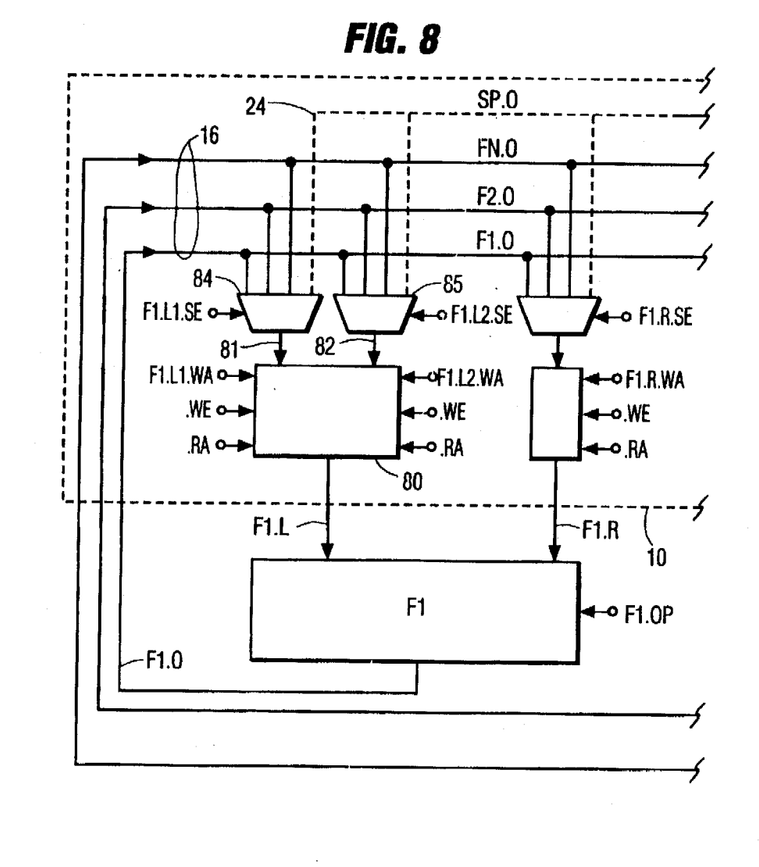
FIG. 8 shows another modification of the generalized processing device of FIG. 1, in accordance with the second aspect of the invention.

FIG. 8 shows an alternative construction of the imitation multiport memory which also has the capacity to avoid a two-value collision. Referring, for the sake of example, to the left operand input of the first functional unit F1, the memory unit 15 for operand F1.L (FIG. 1) has been replaced by a memory unit 80 having two write ports, 81 and 82, each connectable via a respective multiplexer 84 or 85 to any of the bus lines 16. The memory unit 80 requires two write addresses, F1.L1.WA and F1.L2.WA, each with an associated enable signal .WE, and multiplexers 84 and 85 require respective selection signals F1.L1.SE and F1.L2.SE. These signals are again provided by additional fields in the very long instruction word.

Compared to the delay elements 21 (FIG. 1), SP (FIG. 2) and 70 (FIG. 7), the provision of multiple write ports on the single memory unit 80 has the disadvantage that, for the extra circuit complexity involved, only collisions at the F1.L memory unit are avoided. It may be, however, that collisions are most frequent at one particular functional unit, or type of functional unit. If it would not be cost-effective to provide additional functional units of that type, the FIG. 8 embodiment may become attractive. The FIG. 8 circuit has the advantage of not adding a bus line (24, FIG. 1) to the switching circuit. In a typical VLIW machine, the bus lines tend to occupy a substantial part of the circuit area. The multiport memory unit 80 occupies increased area also, but the imitation multiport memory 10 as a whole remains far more efficient than a true multiport memory serving all functional units in common. In any event, the dashed bus line 24 in FIG. 8 shows that the memory unit 80 with multiple write ports can be provided in addition to a delay element, instead of being strictly an alternative. Furthermore, a non-writable location could be included in the multiported memory unit 80, eliminating the need for the two write-enable signals F1.L1.WE and F1.L2.WE, just as in the embodiment of FIGS. 2 to 4 described above.

The end result is that the designer of a VLIW processor has a range of techniques available for improving the performance of the imitation multiport memory so that it more closely approaches that of a true multiport memory. The technique, or combination of techniques, that is appropriate in any given application is a matter of choice for the designer and will vary with the characteristics of the application.

Substantial freedom is also available in choosing the number and type of functional units to be included. While each unit in the specific embodiment of FIG. 2 is specialized to some extent for performing a specific function or group a functions, these groups of functions could all be combined in a more general multi-purpose type of functional unit, for maximum flexibility in scheduling. A disadvantage this type of unit is that a constant latency for all operations is desirable to allow full pipelining, so that the faster operations (such as constant generation) must be slowed down to the speed of the slowest operations. On the other hand, more specialized functional unit types may also be useful in a given application, performing for example floating-point multiplication, barrel shifting or input/output functions. The same types of units as are used in conventional microprocessors are well suited or readily adaptable by the person skilled in the art for inclusion in a processing device according to the present invention.

I claim:

1. A VLIW processing device comprising:
    an instruction register for holding a plurality of operations to be begun in a same operating cycle;
    a plurality of functional units for executing the plurality of operations in parallel;
    a plurality of memory units, each memory unit being permanently and directly connected to a single respective one of the functional units via a respective read port which supplies input data directly to the respective one of the functional units;
    a delay element permanently connected in parallel with the plurality of memory units; and
    a unidirectional switching circuit for providing output signals from the plurality of functional units to write ports of the plurality of memory units and to the delay element, so that
        at least one of the functional units is enabled to write data to one of the plurality of memory units that is connected with a target one of the plurality of functional units; and
        when two of the plurality of functional units need to write to the one memory unit that is connected to the target, output from one of the two is directed to the delay element instead, and thence via the switching circuit to the target, so that a collision is avoided.

2. A processing device as claimed in claim 1 wherein the delay element comprises a single-location memory unit.

3. A processing device as claimed in claim 1 wherein the delay element implements a fixed delay of one or more operating cycles.

4. A processing device as claimed in claim 3 wherein the switching circuit comprises means for, under control of contents of the instruction register, connecting the input of the delay element to an output of the delay element to delay a result for more than one operating cycle.

5. A processing device as claimed in claim 1 wherein the delay element comprises a memory unit having a plurality of addressable locations, enabling simultaneous delay of a plurality of results.

6. A processing device as claimed in claim 1 comprising a plurality of delay elements, enabling simultaneous delay of a plurality of results produced in a single operating cycle.

7. A processing device as claimed in claim 1, including:
    means for causing a conditional branch in response to the plurality of operations, the conditional branch involving a branch delay of at least one operating cycle; and
    means for conditionally inhibiting operations performed by at least one of the plurality of functional units during the branch delay.

8. A processing device as claimed in claim 7 wherein the means for conditionally inhibiting operations on the at least one of the plurality of functional units includes
    a guard value input to the at least one of the plurality of functional units for receiving a boolean guard value determining whether or not to inhibit an operation, and
    a guard value memory unit having a write port connected to the switching circuit and a read port connected to the guard value input of the at least one of the plurality of functional units.

9. A processing device as claimed in claim 8 wherein the guard value memory unit includes one or more non-writable locations which store predetermined boolean values.

10. A processing device as claimed in claim 1 wherein
    each of the plurality of operations contains a respective write address value,
    at least one of the plurality of memory units has a write address input for receiving the respective write address values and includes writable and non-writable locations corresponding to different write address values,
    so that a non-write operation can be effected in any of the plurality of operations by inclusion of a write address value corresponding to a non-writable location, without provision of a separate write-enable value in that operation.

11. A processing device as claimed in claim 1 wherein at least one of the plurality of memory units has more than one write port connected to the switching circuit, so that results from more than one of the plurality of functional units may be simultaneously written to the at least one of the plurality of memory units.

12. A VLIW processing device as claimed in claim 1 wherein the plurality of functional units and the plurality of memory units form part of a monolithic integrated circuit.

13. The device of claim 1 wherein none of the memory units every provides data to more than one functional unit, even in successive clock cycles.

14. The device of claim 1 wherein the operations held in the instruction register in the same operating cycle are of independent types.

15. A VLIW processing device comprising:
    an instruction register for holding a plurality of operations to be begun in a same operating cycle;
    a plurality of functional units for executing the plurality of operations in parallel;
    a plurality of memory units, each memory unit being permanently and directly connected to a single respective one of the functional units via a respective read port which supplies input data directly to the respective one of the functional units, at least one of the plurality of memory units having at least two write ports; and
    a unidirectional switching circuit for providing output signals from the plurality of functional units to write ports of the plurality of memory units, so that more than one of the plurality of functional units is enabled to write data simultaneously to a same one of the at least one of the plurality of memory units which has more than one write port, so that a collision in writing to that memory unit is avoided.

16. A processing device as claimed in claim 15 including
    means for causing a conditional branch in response to the plurality of operations, the conditional branch involving a branch delay of at least one operating cycle; and
    means for conditionally inhibiting operations performed by at least one of the plurality of functional units during the branch delay.

17. A processing device as claimed in claim 16 wherein the means for conditionally inhibiting operations on the at least one of the plurality of functional units includes a guard value input to the at least one of the plurality of functional units for receiving a boolean guard value determining whether or not to inhibit an operation and a guard value memory unit having a write port connected to the switching circuit and a read port connected to the guard value input of the at least one of the plurality of functional units.

18. A processing device as claimed in claim 17 wherein the guard value memory unit includes one or more non-writable locations which store predetermined boolean values.

19. A processing device as claimed in claim 15 wherein each of the plurality of operations contains a respective write address value, at least one of the plurality of memory units has a write address input for receiving the respective write address values and includes writable and non-writable locations corresponding to different write address values, so that a non-write operation can be effected in any of the series of program instructions by inclusion of a write address value corresponding to a non-writable location, without provision of a separate write-enable value in that program instruction.

20. A processing device as claimed in claim 15, wherein the plurality of functional units and the plurality of memory units form part of a monolithic integrated circuit.

21. The device of claim 15, wherein at least one other one of the memory units has only one write port.

22. A processing device for executing operations comprising:

a plurality of functional units for executing the operations in parallel;

a plurality of memory units, each memory unit being permanently and directly connected to a single respective one of the functional units via a respective read port that supplies input data directly to the respective one of the functional units;

a delay element permanently connected in parallel with the memory units; and a unidirectional switching circuit for providing output signals from the plurality of functional units to write ports of the plurality of memory units and to the delay element, so that at least one of the plurality of functional units is enabled to write data to one of the plurality of memory units that is connected with a target one of the functional units; and when two of the plurality of functional units need to write to the one memory unit that is connected to the target, output from one of the two is directed to the delay element instead, and thence via the switching circuit to the target, so that a collision is avoided.

23. The device of claim 22 wherein the operations held in the instruction register in the same operating cycle are of independent types.

24. A processing device for executing operations comprising:

a plurality of functional units for executing the operations in parallel;

a plurality of memory units, each memory unit being permanently and directly connected to a single respective one of the functional units via a respective read port that supplies input data directly to the respective one of the functional units, at least one of the plurality of memory units having at least two write ports; and a switching circuit for providing output signals from the plurality of functional units to write ports of the plurality of memory units, so that more than one of the plurality of functional units is enabled to write data simultaneously to a same one of the at least one of the plurality of memory units which has more than one write port, so that a collision in writing to that memory unit is avoided.

25. The device of claim 24, wherein at least one other one of the memory units has only one write port.

* * * * *